US012649354B2

(12) United States Patent
Moon et al.

(10) Patent No.: US 12,649,354 B2
(45) Date of Patent: Jun. 9, 2026

(54) ELECTRIC COMPRESSOR AND CONTROL METHOD THEREOF

(71) Applicant: Hanon Systems, Daejeon (KR)

(72) Inventors: Chi Myeong Moon, Daejeon (KR);
Sung Joon Lee, Daejeon (KR); Young Min Kim, Daejeon (KR); Hong Min Kim, Daejeon (KR); Gu Hyun Ryu, Daejeon (KR); Soo Cheol Jeong, Daejeon (KR); Joo Young Lee, Daejeon (KR); Jae Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 65 days.

(21) Appl. No.: 18/579,960

(22) PCT Filed: Nov. 25, 2022

(86) PCT No.: PCT/KR2022/018855
§ 371 (c)(1),
(2) Date: Jan. 17, 2024

(87) PCT Pub. No.: WO2023/113290
PCT Pub. Date: Jun. 22, 2023

(65) Prior Publication Data
US 2024/0317024 A1     Sep. 26, 2024

(30) Foreign Application Priority Data

Dec. 16, 2021     (KR) ........................ 10-2021-0180695

(51) Int. Cl.
*B60H 1/32*          (2006.01)

(52) U.S. Cl.
CPC ......... *B60H 1/3208* (2013.01); *B60H 1/3223* (2013.01); *B60H 2001/325* (2013.01); *B60H 2001/3255* (2013.01); *B60H 2001/3292* (2013.01)

(58) Field of Classification Search
CPC ............... B60H 1/3208; B60H 1/3222; B60H 2001/3272; B60H 1/32; B60H 2001/325; B60H 2001/3255; B60H 2001/3292; F04C 18/02; F04C 28/28; F04C 29/04; F04C 18/0215; F04C 29/047
See application file for complete search history.

(56) References Cited

U.S. PATENT DOCUMENTS

2016/0281716 A1*  9/2016  Kawamura ............. F04C 28/06

FOREIGN PATENT DOCUMENTS

| | | | | | |
|---|---|---|---|---|---|
| CN | 1673638 | A | * | 9/2005 | ........... B60H 1/3216 |
| CN | 102639943 | A | * | 8/2012 | ......... B60H 1/00792 |
| EP | 2680434 | A1 | * | 1/2014 | ............... B60L 3/06 |
| JP | H07149138 | A | * | 6/1995 | |
| JP | H09140155 | A | | 5/1997 | |
| JP | 2000289453 | A | | 10/2000 | |

(Continued)

*Primary Examiner* — Kun Kai Ma
(74) *Attorney, Agent, or Firm* — Shumaker, Loop & Kendrick, LLP; James D. Miller

(57) ABSTRACT

An electric compressor of an air conditioning system and a control method thereof. In one method, a stable operation of the electric compressor is ensured by means of logic to protect an inverter unit provided in the electric compressor before an inverter element is damaged due to overheating, so that safety can be secured.

18 Claims, 6 Drawing Sheets

(56) References Cited

FOREIGN PATENT DOCUMENTS

| | | | | | |
|---|---|---|---|---|---|
| JP | 2003326958 | A | | 11/2003 | |
| JP | 2004205118 | A | | 7/2004 | |
| JP | 2005248730 | A | | 9/2005 | |
| JP | 2012237533 | A | | 12/2012 | |
| KR | 20160107855 | A | * | 9/2016 | ............. F04C 28/06 |
| KR | 20200011240 | A | * | 2/2020 | ........... F04D 27/001 |
| KR | 102195809 | B1 | | 12/2020 | |

* cited by examiner

FIG. 4

| Case | TEMPERATURE RISE RATE OF INVERTER UNIT [Δ°c] | GRADIENT CUMULATIVE TIME [s] | TEMPERATURE OF INVERTER UNIT [°c] | REVOLUTIONS PER MINUTE [RPM] |
|---|---|---|---|---|
| 1 | 0.3 OR MORE | 60 OR MORE | 120 OR MORE | 1500 OR LESS |
| 2 | 0.4 OR MORE | 20 OR MORE | 110 OR MORE | 1500 OR LESS |
| 3 | 0.55 OR MORE | 10 OR MORE | 100 OR MORE | 1500 OR LESS |

ELECTRIC COMPRESSOR AND CONTROL METHOD THEREOF

CROSS REFERENCE TO RELATED PATENT APPLICATIONS

This is a U.S. national phase patent application of PCT/KR2022/018855 filed Nov. 25, 2022 which claims the benefit of and priority to Korean Patent Application No. 10-2021-0180695, filed on Dec. 16, 2021, the entire contents of each of which are incorporated herein by reference.

TECHNICAL FIELD

The present disclosure is designed to prevent an inverter unit provided in an electric compressor from being overheated at high temperature, and more particularly to the electric compressor and a control method thereof.

BACKGROUND ART

Generally, a compressor which is used in an air conditioning system of a vehicle sucks an evaporated refrigerant from an evaporator, causes the refrigerant to be in a high-temperature and high-pressure condition where the refrigerant is easily liquefied, and transmits to a condenser. In such a compressor, a configuration for compressing the refrigerant includes a reciprocating type compressor that compresses the refrigerant while performing a reciprocating motion and a rotary type compressor that compresses the refrigerant while performing a rotational motion.

The rotary type compressor is divided into a mechanical type compressor that rotates by using an engine as a driving source and an electric type compressor that rotates by using a motor as a driving source.

When outdoor air temperature is low such as a change of season or winter, the temperature of the refrigerant falls below its boiling point, resulting in a phase change from a gaseous state to a liquid state. While the compressor is functionally capable of compressing a gaseous refrigerant, it cannot compress a liquid refrigerant. Therefore, when a liquid refrigerant is introduced, there occurs a problem that fatigue gradually accumulates due to a fluid resistance in a compression system.

When liquid compression is started in the compressor of the air conditioning system, the pressure and enthalpy of the refrigerant rise and the refrigerant changes into a gaseous state. A time required for the refrigerant to change into a gaseous state has a significant impact on the determination of the durability of the compressor.

Among these, the electric compressor has a scroll-type compression mechanism. A motor and a compression mechanism are connected and the refrigerant is compressed by the driving of the motor. The driving of the motor is controlled by an inverter equipped with a printed circuit board.

The electric compressor generates heat during the driving process. The heat is continuously generated during the driving process, and especially when the electric compressor is driven under high load conditions, more heat is generated from various parts such as the motor, the inverter, etc., with the increase of the number of revolutions of the motor, causing the temperature of the electric compressor to rise significantly.

Such excessive temperature rise of the electric compressor causes damage to various parts of the electric compressor. For this reason, the temperature is lowered by radiating the heat to the outside through a heat radiating plate provided in the electric compressor, or alternatively, the electric compressor is sometimes stopped in order to reduce the heat generation.

However, even though the temperature of the electric compressor is reduced through this process, the waste heat is thrown away as it is, causing a problem of low energy efficiency of the electric compressor.

In addition, the driving of the electric compressor under high load conditions causes rapid rise of the temperature and affects the driving performance. Therefore, as a maximum revolutions per minute of the electric compressor decreases, the performance is reduced. Here, the high load condition may be, for example, a case where a high temperature condition where the outdoor air temperature is around 50 degrees during a vehicle stop is maintained or a case where a vehicle is parked in the outdoors to which direct rays of the sun are directly irradiated. Further, the high load condition may also include other conditions.

The air conditioning system provided in the vehicle sucks the refrigerant that has been completely evaporated from the evaporator, causes the refrigerant to be in a high-temperature and high-pressure condition where the refrigerant is easily liquefied, and transmits to the condenser.

The electric compressor generates heat during the driving process. The heat is continuously generated during the driving process, and especially when the electric compressor is driven under high load conditions, more heat is generated from various parts such as the motor, the inverter, etc., with the increase of the number of revolutions of the motor, causing the temperature of the electric compressor to rise significantly.

Such excessive temperature rise of the electric compressor causes damage to various parts of the electric compressor. For this reason, the temperature is lowered by radiating the heat to the outside through a heat radiating plate provided in the electric compressor, or alternatively, the electric compressor is sometimes stopped in order to reduce the heat generation.

For example, the inverter includes a motor driving circuit and a control unit. The motor driving circuit may become high temperature due to the heat generation of a semiconductor switching element that constitutes the circuit.

In this case, the current control value of a semiconductor device within the inverter decreases due to the high temperature. Also, if a current above the control value flows, it may occur that the semiconductor device is damaged. In addition, since the electric compressor is disposed within an engine room, the inverter may become high temperature due to heat generation of the engine.

In order to prevent such overheating of the inverter, conventionally, when the temperature of the inverter rises above a predetermined temperature, the compressor is stopped to protect the inverter until the temperature of the inverter sufficiently decreases. However, there is still a risk of damage, so that countermeasures for the risk are needed.

SUMMARY

The purpose of the present disclosure is to provide an electric compressor for stably preventing an inverter unit provided in the electric compressor from being damaged due to overheating and a control method thereof.

One embodiment is a control method of an electric compressor. The control method includes: a step of determining a current discharge pressure state of the electric compressor while an air conditioner provided in the vehicle becomes an on-state; a second step of determining current revolutions per minute information of the electric compressor, temperature information of the inverter unit, and phase current information when the discharge pressure corresponds to an overload pressure; a third step in which a state where a high temperature error signal becomes the on-state is maintained when the inverter unit is overheated; and a fourth step ST400 of determining whether the electric compressor is operated or not according to a discharge pressure of the inverter unit after the high temperature error signal becomes the on-state.

The first step further includes a cooling fan operation checking step of checking whether a cooling fan provided in the vehicle operates.

The first step further includes an inverter unit temperature sensing step of sensing a current temperature of the inverter unit when the discharge pressure is equal to or lower than the overload pressure.

The second step includes: a revolutions per minute determination step of determining a current revolutions per minute state of the electric compressor; an inverter unit temperature determination step of determining whether the temperature of the inverter unit falls within a predetermined overheating temperature range; and a phase current determination step of determining whether a phase current of the electric compressor is maintained above a certain value.

The revolutions per minute determination step is performed when the revolutions per minute of the electric compressor is 1000 RPM or less.

The inverter unit temperature determination step is performed when the temperature of the inverter unit is either higher than outdoor air temperature or is maintained above a first temperature.

The phase current determination step is performed when the phase current is maintained above a first current value.

In the second step, when, at the same time, the current revolutions per minute of the electric compressor corresponds to a low revolutions per minute and the temperature of the inverter unit is maintained in the overheating temperature range and the phase current is maintained above a certain value, it is determined that the inverter unit is overheated.

The third step further includes a step in which the high temperature error signal becomes an on-state and simultaneously the operation of the electric compressor is switched to a temporary stop state.

The third step further includes a high temperature error waiting step in which a waiting state is maintained for a first time period after a high temperature error code is generated.

The fourth step after the third step further includes a discharge pressure rechecking step of rechecking the discharge pressure after the first time period.

When the discharge pressure continues to be maintained above a predetermined pressure even after the discharge pressure is rechecked, the control method moves to the step before the discharge pressure rechecking step.

The fourth step includes a step in which power of the vehicle is turned off when the discharge pressure continues to be maintained at the predetermined pressure after moving to the discharge pressure rechecking step.

The fourth step further includes a step of restarting the electric compressor when the discharge pressure is equal to or lower than the predetermined pressure in the discharge pressure rechecking step.

After the discharge pressure is restarted, the control method moves to the first step and rechecks the discharge pressure state.

Another embodiment is a control method of an electric compressor. The control method includes: a step of determining a current discharge pressure state of the electric compressor while an air conditioner provided in the vehicle becomes an on-state; a second step of determining current revolutions per minute information of the electric compressor, temperature information of the inverter unit, phase current information, and cumulative time information and a temperature rise rate of the inverter unit when the discharge pressure corresponds to an overload pressure; a third step in which a state where a high temperature error signal becomes the on-state is maintained when the inverter unit is overheated; and a fourth step of determining whether the electric compressor is operated or not according to a discharge pressure of the inverter unit after the high temperature error signal becomes the on-state.

Further another embodiment is an electric compressor including: a compression unit equipped with a compression mechanism for compressing a refrigerant; a motor unit configured to be coupled to one side of the compression unit and to be equipped with a motor that provides a driving force to the compression mechanism; an inverter unit configured to be coupled to one side of the motor unit and to be equipped with an inverter for controlling the motor unit; a sensing unit configured to sense a revolutions per minute and a discharge pressure of the compression unit, a temperature of the inverter unit, a phase current applied to the compression unit, and a temperature rise rate of the inverter unit; and a control unit configured to receive the information sensed by the sensing unit and to determine an overheated state of the inverter unit.

The control unit simultaneously receives not only the information sensed by the sensing unit but also whether a cooling fan provided in a vehicle operates and then determines whether the inverter unit is overheated.

According to the embodiments, in a vehicle equipped with the electric compressor, the inverter unit is switched to a stop state before being damaged due to overheating, and then is restarted or stopped depending on a discharge pressure state, thereby improving safety.

According to the embodiments, conditions for determining whether the inverter unit is overheated are more accurately input, and the electric compressor can be controlled before a point of time when an inverter element is damaged or immediately after the inverter unit is overheated.

According to the embodiments, even when the electric compressor operates normally or the inverter unit operates abnormally due to overheating, control safety is maintained constant, and thus, durability can be improved.

DESCRIPTION OF DRAWINGS

FIG. 4 shows a temperature rise rate of an inverter unit according to the according to the embodiment and consequent conditions;

DESCRIPTION OF AN EMBODIMENT

Figure 1:
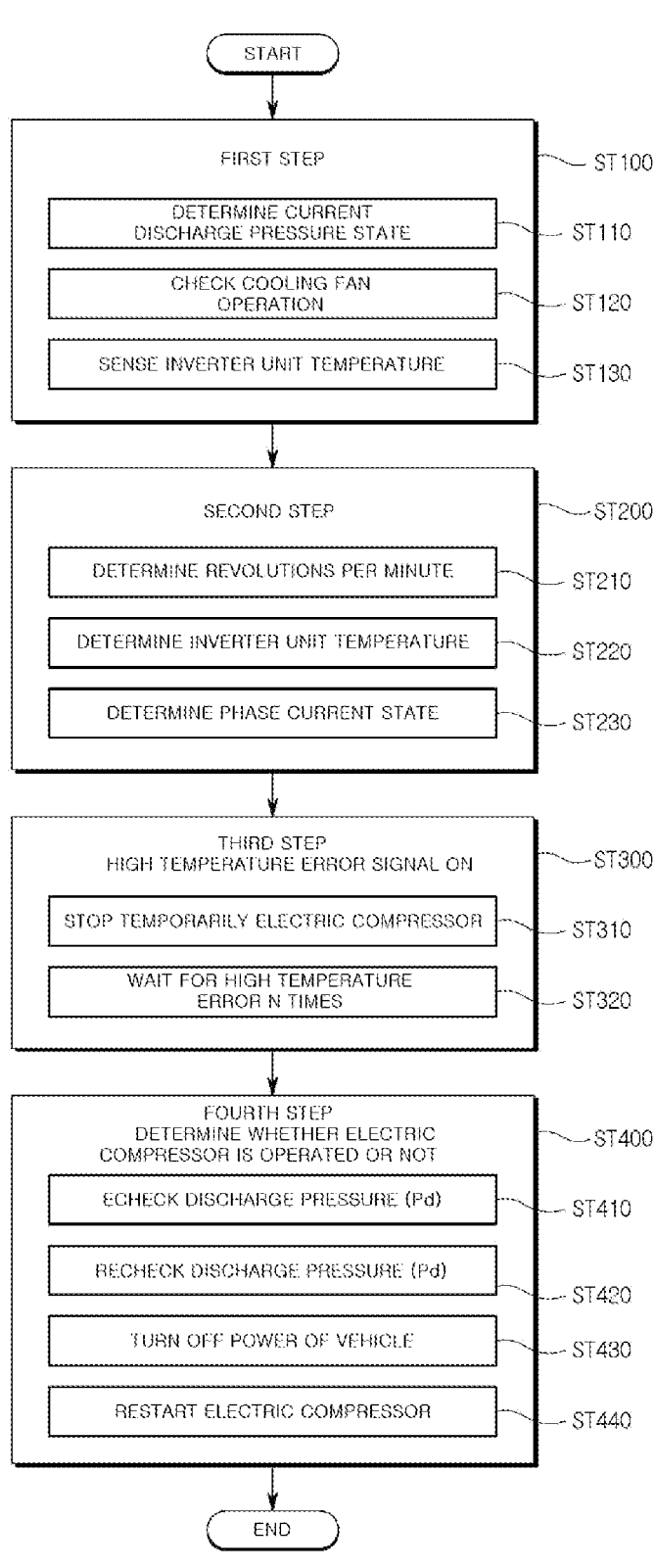
FIG. 1 is a flowchart showing a control method of an electric compressor according to an embodiment of the present disclosure.

The features, advantages and method for accomplishment of the present invention will be more apparent from referring to the following detailed embodiments described as well as the accompanying drawings. However, the present invention is not limited to the embodiment to be disclosed below and is implemented in different and various forms. The embodiments bring about the complete disclosure of the present invention and are provided to make those skilled in the art fully understand the scope of the present invention. The same reference numerals throughout the disclosure correspond to the same elements.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

While terms such as the first and the second, etc., can be used to describe various components, the components are not limited by the terms mentioned above. The terms are used only for distinguishing between one component and other components.

Figure 2:
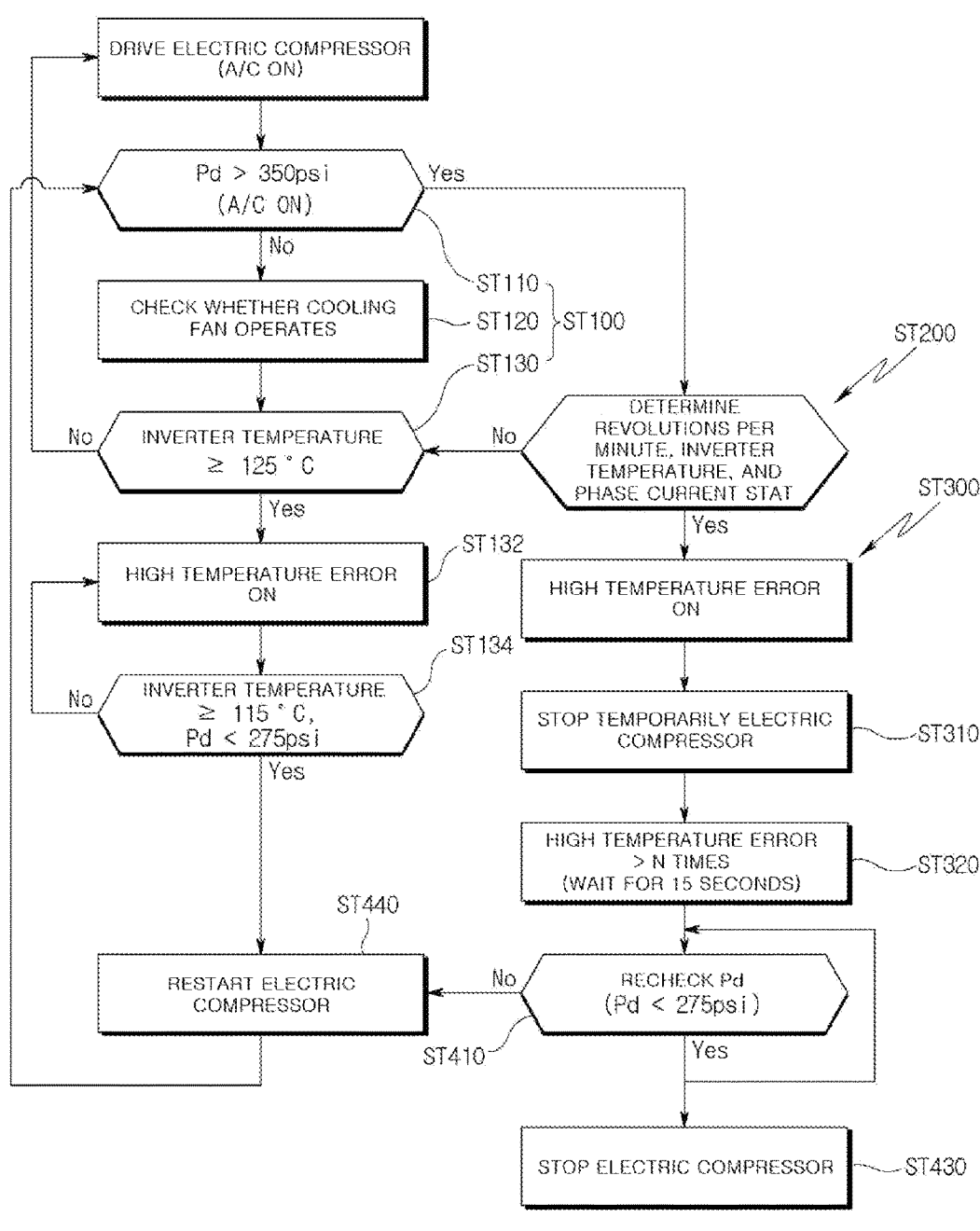
FIG. 2 is an operation flowchart according to FIG. 1.

A control method of an electric compressor according to an embodiment will be described with reference to the drawings. For reference, FIG. 1 is a flowchart showing a control method of the electric compressor according to the embodiment. FIG. 2 is an operation flowchart according to FIG. 1.

Referring to the accompanying FIGS. 1 and 2, the control method of the electric compressor according to the embodiment is used under a condition that cooling in an inverter unit becomes unstable or a cooling fan does not operate due to leakage of a refrigerant or due to insufficient amount of sucked refrigerant in an air conditioning system provided in a vehicle.

In addition, the embodiment is intended to prevent damage to an inverter element due to heat generation of the inverter unit when the electric compressor is operated under conditions in which direct solar radiation is applied to the vehicle while outdoor air temperature is maintained at around 50 degrees.

To this end, the embodiment includes a first step ST100 including a step ST110 of determining a current discharge pressure state of the electric compressor while an air conditioner provided in the vehicle becomes an on-state, a second step ST200 of determining current revolutions per minute information of the electric compressor, temperature information of the inverter unit, and phase current information when the discharge pressure corresponds to an overload pressure, a third step ST300 in which a state where a high temperature error signal becomes the on-state is maintained when the inverter unit is overheated, and a fourth step ST400 of determining whether the electric compressor is operated or not according to a discharge pressure of the inverter unit after the high temperature error signal becomes the on-state.

The first step ST100 further includes a cooling fan operation checking step ST120 of checking whether the cooling fan provided in the vehicle operates. When the air conditioning system provided in the vehicle operates normally, outdoor air is supplied to a condenser through the cooling fan and the cooling the condenser is performed, so that the temperature is lowered and a phase change of the refrigerant is induced.

If the cooling fan does not operate, the outdoor air is not supplied to the condenser, and thus, the cooling of the condenser is stopped and the high temperature state is maintained. In the electric compressor, a phase change in which a high-temperature and high-pressure gaseous refrigerant discharged from the compressor is changed into a liquid refrigerant in the condenser is performed. Based on the premise that the cooling by the outdoor is stably performed, the gaseous refrigerant is converted into a liquid refrigerant.

If the cooling fan does not operate, the high-temperature and high-pressure gaseous refrigerant is present in the condenser and the temperature of the electric compressor rises rapidly to a high temperature, and thus, the temperature of the inverter unit also rises simultaneously. Therefore, whether or not the cooling fan operates corresponds to an important condition capable of preventing damage to the inverter element by fire or preventing the failure of the inverter element.

The present embodiment further includes an inverter unit temperature sensing step ST130 of sensing a current temperature of the inverter unit when the discharge pressure is equal to or lower than the overload pressure. The overload pressure is described as having a value of 350 psi as an example, but may be changed depending on design conditions.

When the electric compressor is operated in a normal state, the discharge pressure does not remain in the overload pressure condition. However, as described above, under the condition that the cooling fan does not operate, when direct solar radiation is applied to the vehicle while outdoor air temperature is maintained at around 50 degrees, it is determined that the current discharge pressure is the overload pressure as the refrigerant is discharged at a discharge pressure of 350 psi or more.

If the discharge pressure is equal to or lower than the overload pressure, whether or not the inverter unit is overheated is determined by sensing (ST130) the current temperature of the inverter unit.

For example, if the temperature of the inverter unit is equal to or higher than 125 degrees, the high temperature error signal is maintained in the on-state (ST132). Also, whether or not the inverter unit is overheated is checked again (ST134) by determining again based on the temperature and discharge pressure of the inverter unit whether the inverter unit is actually overheated.

If the temperature of the inverter unit is measured below 115 and the discharge pressure is below 275 psi, the electric compressor is restarted.

In the embodiment, as described above, when the electric compressor operates normally, the electric compressor is continuously operated by determining the temperature of the inverter and the discharge pressure. Conversely, when the discharge pressure is still above 350 psi, the inverter unit is overheated and the electric compressor operates abnormally.

In the embodiment, even when the electric compressor operates abnormally, logic that prevents malfunction due to overheating of the inverter unit can be implemented. This will be described.

The second step ST200 includes a revolutions per minute determination step ST210 of determining a current revolutions per minute state of the electric compressor when the discharge pressure corresponds to the overload pressure, an inverter unit temperature determination step ST220 of determining whether the temperature of the inverter unit falls within a predetermined overheating temperature range, and a phase current determination step ST230 of determining whether a phase current of the electric compressor is maintained above a certain value.

In the embodiment, whether or not the electric compressor is overheated is determined not only by discharge pressure information but also by simultaneously determining the state of the number of revolutions per minute of the electric compressor, whether the overheating temperature range of the temperature of the inverter unit exists, and state information of the phase current, so that it is possible to accurately determine whether the inverter element is actually maintained in an overheated state, thereby preventing damage to the inverter element by fire and ensuring stable operation of the electric compressor.

As an example, the revolutions per minute determination step ST210 is performed when the revolutions per minute of the electric compressor is 1000 RPM or less. The mentioned 1000 RPM corresponds to a case where the vehicle is operated at a low speed from a stop state, that is to say, a case where the electric compressor is operated in a state where the pressure and temperature of the inside the electric compressor are high.

When the electric compressor is operated at revolutions per minute of 1000 RPM, the cyclic movement of the refrigerant decreases compared to the normal state, and a cooling efficiency of the inverter unit is also relatively degraded. Therefore, when the revolutions per minute is low, the overheating of the inverter unit may further increase.

The inverter unit temperature determination step ST220 is performed when the temperature of the inverter unit is either higher than the outdoor air temperature or is maintained above a first temperature. For example, the first temperature corresponds to a temperature of 80 degrees or higher. When the temperature of the inverter unit increases due to self-heating, the above-mentioned temperature is determined as temperature at which the inverter unit enters the overheated state.

In addition, the temperature of the inverter unit and the outdoor air temperature are received as inputs and used as information to determine more accurately whether the inverter unit is overheated or not according to the temperature of the inverter unit. Therefore, by accurately determining the condition of the electric compressor, the information can be used as logic to protect the inverter unit when the inverter unit operates abnormally.

The phase current determination step ST230 is performed when the phase current is maintained above a first current value. For example, the phase current determination step is performed when the first current value is maintained above 33 A. The phase current is applied to three phases U, V, and W in order to generate torque required for the electric compressor to operate. If the phase current is maintained above 33 A, the inverter unit is determined as being overheated.

In the embodiment, when, at the same time, the current revolutions per minute of the electric compressor corresponds to a low revolutions per minute and the temperature of the inverter unit is maintained in the overheating temperature range and the phase current is maintained above a certain value, it is determined that the inverter unit is overheated. This improves both accuracy and safety at the same time.

As such, when the electric compressor satisfies the above-mentioned state conditions under the overload pressure conditions and is determined to be in the overheated state (ST300), the high temperature error signal becomes the on-state and simultaneously the operation of the electric compressor is switched to a temporary stop state (ST310).

If the inverter unit is maintained to operate while being overheated, the inverter unit is damaged due to failure thereof and the inverter element is damaged by fire. Therefore, the electric compressor together with the high temperature error signal no longer operates and is switched to a temporary stop state, first preventing damage by fire due to overheating of the inverter unit.

The third step ST300 further includes a high temperature error waiting step ST320 in which a waiting state is maintained for a first time period after a high temperature error code is generated.

In the high temperature error waiting step ST320, for example, the waiting state is maintained for 15 seconds, the operation of the electric compressor is stopped during the above time period, and the number of times is maintained up to three.

Also, in the fourth step ST400, the current discharge pressure of the electric compressor is rechecked (ST410) after the first time period and whether or not the restart of the electric compressor is possible is checked.

If the discharge pressure of the electric compressor is greater than 275 psi, the control method moves to the step before the step ST410 of rechecking the discharge pressure of the electric compressor, and determines the discharge pressure again (ST420).

For example, there may be a case where the discharge pressure of the electric compressor temporarily rises and then falls, so that it is necessary to recheck the discharge pressure once again.

In the embodiment, if the discharge pressure is still above 275 psi as a result of rechecking the discharge pressure (ST420), the power of the vehicle is forcibly turned off in order to prevent damage to the inverter element by fire due to overheating of the inverter unit (ST430).

As such, when the power of the vehicle is turned off, the operation of the electric compressor is stopped, preventing an environment in which the inverter unit may be overheated, and preventing in advance damage to the electric compressor due to the damage to the inverter element by fire. Therefore, the expensive electric compressor can be stably protected.

After the operation of the compressor is stopped, the air conditioner no longer operates. Therefore, the vehicle is moved to an auto repair shop and maintenance is performed.

In the embodiment, when the discharge pressure is 275 psi or less, the step is switched to a step ST500 of restarting the electric compressor, and the air conditioner can be operated to cool the interior of the vehicle.

Also, even after the electric compressor is restarted, the discharge pressure is checked again as in the first step ST100 to determine whether the discharge pressure corresponds to the overload pressure.

A control method of an electric compressor according to another embodiment of the present disclosure will be described with reference to the drawings.

Figure 3:
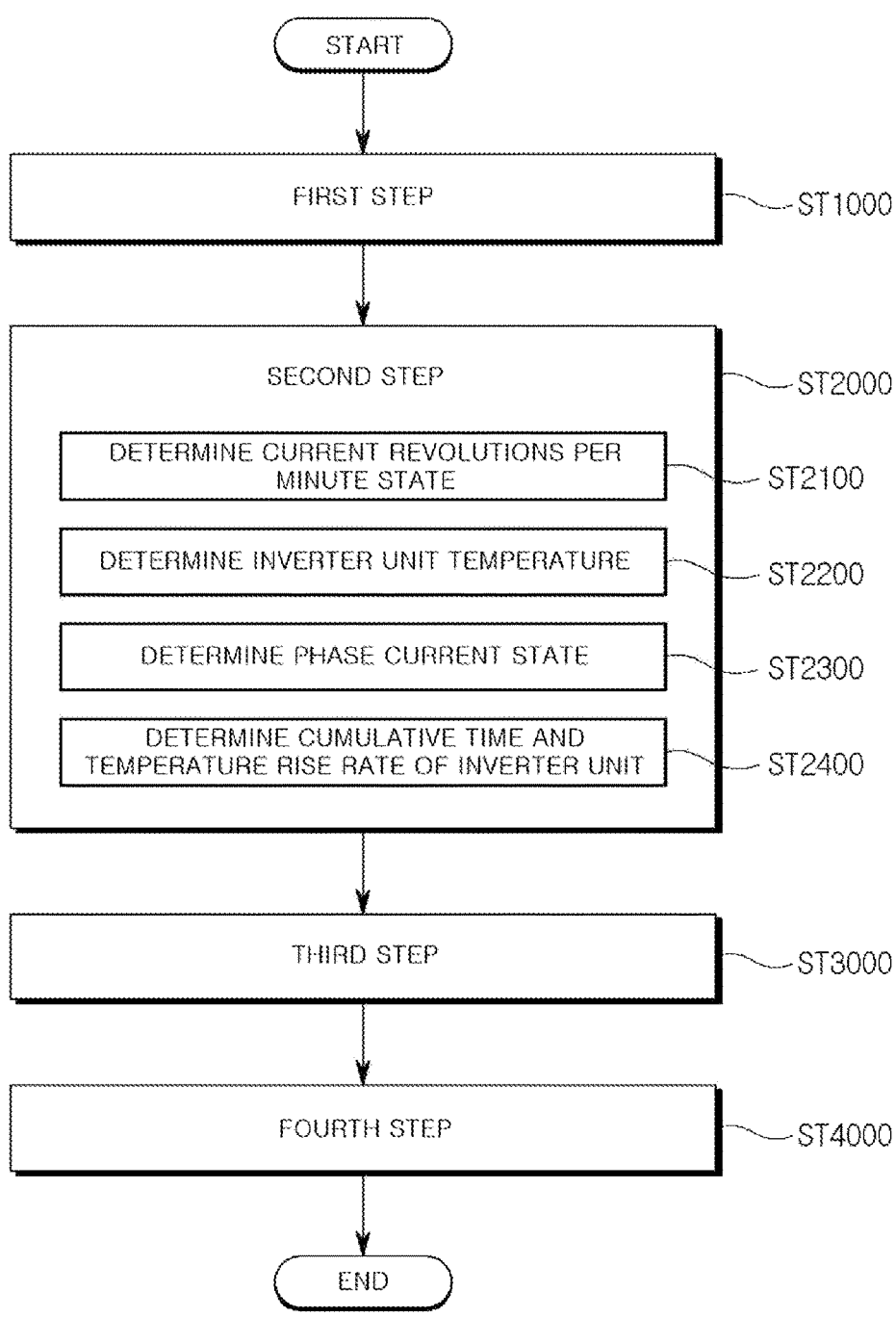
FIG. 3 is a flowchart showing a control method of an electric compressor according to another embodiment of the present disclosure.

Referring to the accompanying FIG. 3, the embodiment includes a first step ST1000 including a step of determining a current discharge pressure state of the electric compressor while an air conditioner provided in the vehicle becomes an on-state, a second step ST2000 of simultaneously determining current revolutions per minute information of the electric compressor, temperature information of an inverter unit, phase current information, and cumulative time information and a temperature rise rate of the inverter unit when the discharge pressure corresponds to an overload pressure, a third step ST3000 in which a state where a high temperature error signal becomes the on-state is maintained when the inverter unit is overheated, and a fourth step ST4000 of determining whether the electric compressor is operated or not according to a discharge pressure of the inverter unit after the high temperature error signal becomes the on-state.

Since the first step ST1000 is similar to the above-described first step ST100 of the previous embodiment, detailed description thereof will be omitted and the second step ST2000 will be described. The second step ST2000 includes a revolutions per minute determination step ST2100 of determining a current revolutions per minute state of the electric compressor, an inverter unit temperature determination step ST2200 of determining whether the temperature of the inverter unit falls within a predetermined overheating temperature range, a phase current determination step ST2300 of determining whether a phase current of the electric compressor is maintained above a certain value, and a cumulative time and temperature rise rate determination step ST2400 of simultaneously determining the cumulative time and temperature rise rate of the inverter unit. The second step ST2000 determines whether or not the inverter unit is overheated. Therefore, the second step ST2000 is different from the second step ST200 in that the second step ST2000 is able to determine more accurately a risk of damage due to rapid rise of the temperature of the inverter unit.

The revolutions per minute determination step ST2100 is performed when the revolutions per minute of the electric compressor is 1000 RPM or less. The mentioned 1000 RPM corresponds to a case where the vehicle is operated at a low speed from a stop state, that is to say, a case where the electric compressor is operated in a state where the pressure and temperature of the inside the electric compressor are high.

When the electric compressor is operated at revolutions per minute of 1000 RPM, the cyclic movement of the refrigerant decreases compared to the normal state, and a cooling efficiency of the inverter unit is also relatively degraded. Therefore, when the revolutions per minute is low, the overheating of the inverter unit may further increase.

The inverter unit temperature determination step ST2200 may be performed when the temperature of the inverter unit is either higher than the outdoor air temperature or is maintained above a first temperature. The first temperature corresponds to a temperature that is maintained above 80 degrees. When the temperature of the inverter unit increases due to self-heating, the above-mentioned temperature is determined as temperature at which the inverter unit enters the overheated state.

In addition, the temperature of the inverter unit and the outdoor air temperature are received as inputs and used as information to determine more accurately whether the inverter unit is overheated or not according to the temperature of the inverter unit. Therefore, by accurately determining the condition of the electric compressor, the information can be used as logic to protect the inverter unit when the inverter unit operates abnormally.

The phase current determination step ST2300 is performed when the phase current is maintained above a first current value. For example, the phase current determination step is performed when the first current value is maintained above 33 A. The phase current is applied to three phases U, V, and W in order to generate torque required for the electric compressor to operate. If the phase current is maintained above 33 A, the inverter unit is determined as being overheated.

In the embodiment, the current revolutions per minute of the electric compressor corresponds to a low revolutions per minute, and the temperature of the inverter unit is maintained in the overheating temperature range. Also, whether or not the inverter unit is overheated is determined by simultaneously determining whether the phase current is maintained above a certain value and the cumulative time and temperature rise rate of the inverter unit. This improves both accuracy and safety at the same time.

If the cumulative time and temperature rise rate of the inverter unit correspond to cases 1 to 3 of FIG. 4, it can be determined that the inverter unit has entered the overheated state.

For example, even when the cumulative time and temperature rise rate of the inverter unit correspond to case 1, if the cumulative time is less than the time shown in the drawing or the temperature of the inverter unit is below 120 degrees, it is determined that the inverter unit is in a state of being before being overheated.

As such, by adding the cumulative time information and temperature rise rate to the determination of whether or not the inverter unit is overheated, whether the electric compressor operates normally or abnormally as well as the discharge pressure information of the electric compressor is accurately determined, and thus, control is immediately performed accordingly, thereby minimizing the occurrence of failure of the electric compressor.

The electric compressor according to the embodiment will be described with reference to the drawings.

Figure 5:
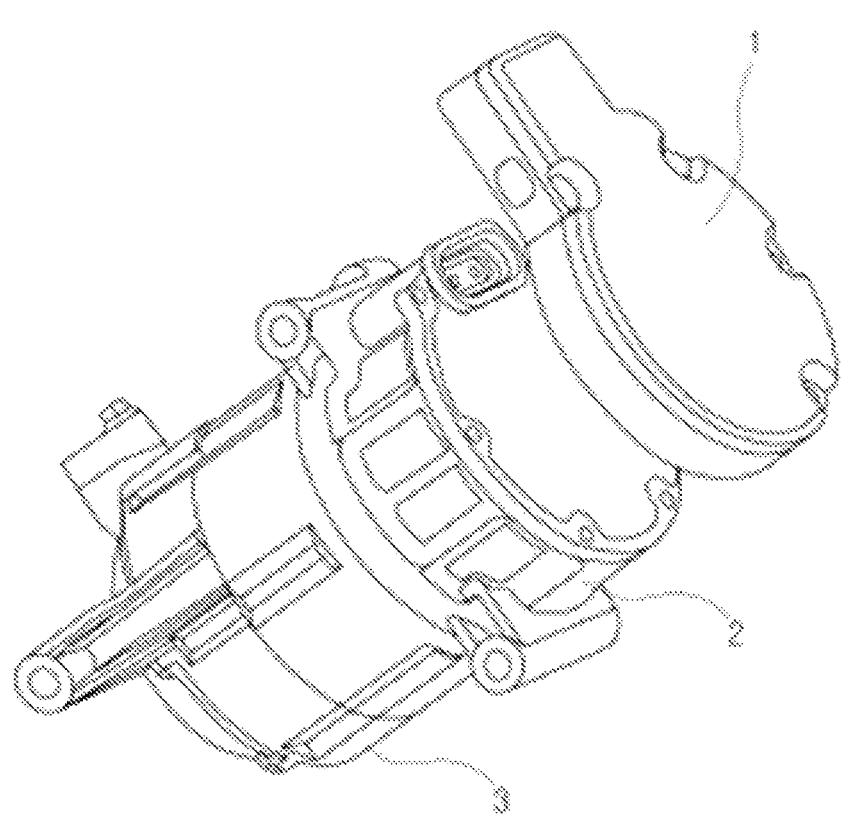
FIG. 5 is a perspective view showing the electric compressor according to the embodiment.
Figure 6:
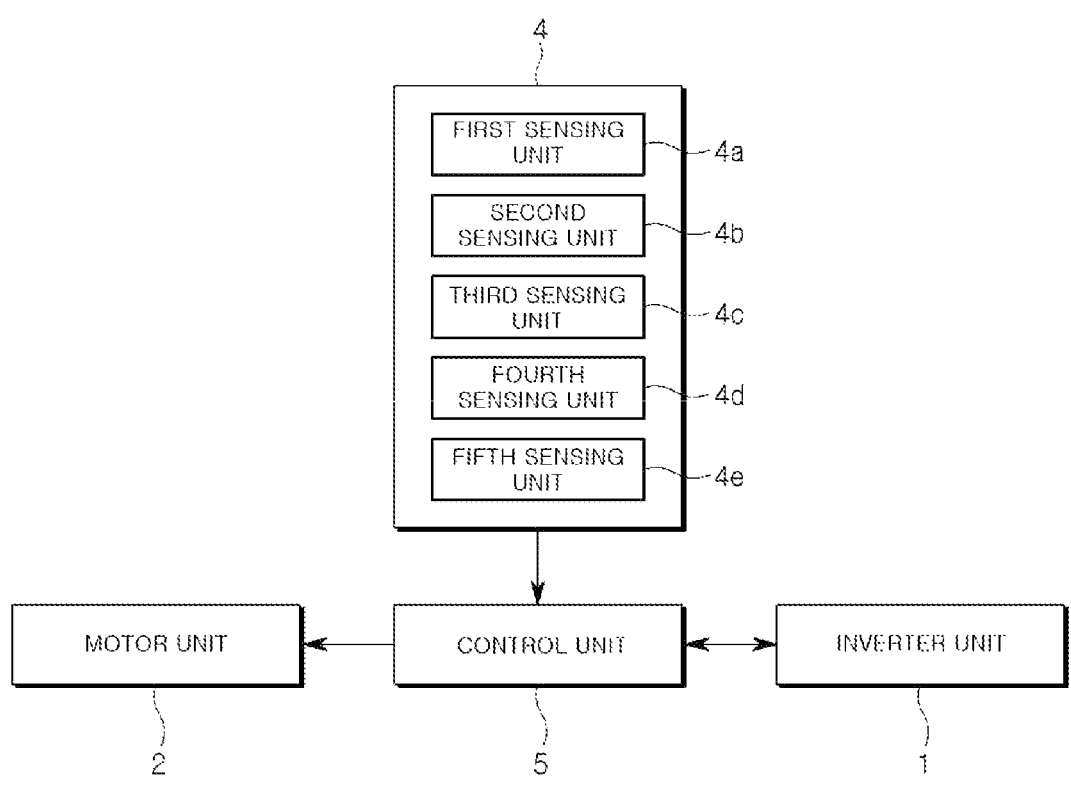
FIG. 6 shows a controller and surrounding components of the controller according to the embodiment.

Referring to the accompanying FIGS. 5 and 6, the electric compressor includes a compression unit 3 equipped with a compression mechanism for compressing a refrigerant, a motor unit 2 configured to be coupled to one side of the compression unit 3 and to be equipped with a motor that provides a driving force to the compression mechanism, an inverter unit 1 configured to be coupled to one side of the motor unit 2 and to be equipped with an inverter for controlling the motor unit 2, a sensing unit 4 configured to sense the revolutions per minute and discharge pressure of the compression unit 3, the temperature of the inverter unit 1, the phase current applied to the compression unit 3, and the temperature rise rate of the inverter unit 1, and a control unit 5 configured to receive the information sensed by the sensing unit 4 and to determine the overheated state of the inverter unit 1.

The control unit 5 simultaneously receives not only the information sensed by the sensing unit 4 but also whether the cooling fan provided in the vehicle operates and then determines whether the inverter unit 1 is overheated.

The sensing unit 4 includes a first sensing unit 4a that senses the discharge pressure of the compression unit 3, a second sensing unit 4b that senses the revolutions per minute of the compression unit 3, a third sensing unit 4c that senses the temperature of the inverter unit 1, a fourth sensing unit 4d that senses the phase current applied to the compression unit 3, and a fifth sensing unit 4e that senses the temperature rise rate of the inverter unit 1.

The control unit 5 not only controls the motor unit 2 but also receives information sensed by the first to fifth sensing units 4a, 4b, 4c, 4d, and 4e to accurately determine whether the inverter unit 1 is overheated or not, thereby preventing the occurrence of failure of the electric compressor.

When the electric compressor operates under normal conditions, the control unit 5 compares predetermined data with the information input through the sensing unit 4, thereby accurately determining whether the inverter unit 1 is overheated.

While the one embodiment of the present invention has been described, it is possible for those skilled in the art to make various changes and modifications of the forms and details of the present invention by means of addition, change, elimination or supplement, etc., of the components of the present invention without departing from the spirit of the present invention, which also belongs to the scope of rights of the present invention.

According to the embodiments, the overheating of the inverter unit is prevented, ensuring stable operation of the electric compressor.

The invention claimed is:

1. A control method of an electric compressor, the control method comprising:
a step of determining a current discharge pressure state of the electric compressor responsive to an air conditioner provided in a vehicle becoming in an on-state;
a second step of determining current revolutions per minute information of the electric compressor, temperature information of an inverter unit, and phase current information responsive to the current discharge pressure corresponding to an overload pressure;
a third step in which a state where a temperature error signal becomes activated responsive to the inverter unit becoming overheated; and
a fourth step of determining whether the electric compressor is operated or not according to the current discharge pressure after the temperature error signal is activated.

2. The control method of the electric compressor of claim 1, wherein the first step further comprises a cooling fan operation checking step of checking whether a cooling fan provided in the vehicle operates.

3. The control method of the electric compressor of claim 1, wherein the first step further comprises an inverter unit temperature sensing step of sensing a current temperature of the inverter unit responsive to the discharge pressure becoming equal to or lower than the overload pressure.

4. The control method of the electric compressor of claim 1, wherein the second step comprises:
a revolutions per minute determination step of determining a current revolutions per minute state of the electric compressor;
an inverter unit temperature determination step of determining whether a temperature of the inverter unit falls within a predetermined overheating temperature range; and a phase current determination step of determining whether a phase current of the electric compressor is maintained above a certain value.

5. The control method of the electric compressor of claim 4, wherein the revolutions per minute determination step is performed responsive to the current revolutions per minute of the electric compressor becoming 1000 RPM or less.

6. The control method of the electric compressor of claim 4, wherein the inverter unit temperature determination step is performed responsive to the temperature of the inverter unit either becoming higher than outdoor air temperature or is maintained above a first temperature.

7. The control method of the electric compressor of claim 4, wherein the phase current determination step is performed responsive to the phase current being maintained above a first current value.

8. The control method of the electric compressor of claim 4, wherein, in the second step, responsive to, at the same time, the current revolutions per minute of the electric compressor correspond to a low revolutions per minute and the temperature of the inverter unit being maintained in the overheating temperature range and the phase current being maintained above a certain value, it is determined that the inverter unit is overheated.

9. The control method of the electric compressor of claim 1, wherein the third step further comprises a step in which the temperature error signal is activated and simultaneously an operation of the electric compressor is switched to a temporary stop state.

10. The control method of the electric compressor of claim 9, wherein the third step further comprises a high temperature error waiting step in which a waiting state is maintained for a first time period after a high temperature error code is generated.

11. The control method of the electric compressor of claim 10, wherein the fourth step after the third step further comprises a discharge pressure rechecking step of rechecking the discharge pressure after the first time period.

12. The control method of the electric compressor of claim 11, wherein, responsive to the discharge pressure continuing to be maintained above a predetermined pressure even after the discharge pressure is rechecked, the control method moves to the step before the discharge pressure rechecking step.

13. The control method of the electric compressor of claim 12, wherein the fourth step comprises a step in which power of the vehicle is turned off responsive to the discharge pressure continuing to be maintained at the predetermined pressure after moving to the discharge pressure rechecking step.

14. The control method of the electric compressor of claim 11, wherein the fourth step further comprises a step of restarting the electric compressor responsive to the discharge pressure becoming equal to or lower than a predetermined pressure in the discharge pressure rechecking step.

15. The control method of the electric compressor of claim 14, wherein, after the electric compressor is restarted, the control method moves to the first step and rechecks the current discharge pressure state.

16. A control method of an electric compressor, the control method comprising:
a step of determining a current discharge pressure state of the electric compressor responsive to an air conditioner provided in a vehicle becoming in an on-state;
a second step of determining current revolutions per minute information of the electric compressor, temperature information of an inverter unit, phase current information, and cumulative time information and a temperature rise rate of the inverter unit responsive to the current discharge pressure corresponding to an overload pressure;

a third step in which a state where a temperature error signal is activated responsive to the inverter unit becoming overheated; and a fourth step of determining whether the electric compressor is operated or not according to the current discharge pressure after the temperature error signal is activated.

17. The control method of the electric compressor of claim 16, wherein the electric compressor comprises:

a compression unit equipped with a compression mechanism for compressing a refrigerant;

a motor unit configured to be coupled to one side of the compression unit and to be equipped with a motor that provides a driving force to the compression mechanism;

an inverter unit configured to be coupled to one side of the motor unit and to be equipped with an inverter for controlling the motor unit;

a sensing unit configured to sense a revolutions per minute and a discharge pressure of the compression unit, a temperature of the inverter unit, a phase current applied to the compression unit, and a temperature rise rate of the inverter unit; and a control unit configured to receive information sensed by the sensing unit and to determine an overheated state of the inverter unit.

18. The electric compressor of claim 17, wherein the control unit simultaneously receives not only the information sensed by the sensing unit but also whether a cooling fan provided in a vehicle operates and then determines whether the inverter unit is overheated.

* * * * *